C. EATON.

Improvement in Curtain-Fixtures.

No. 5,576. Reissued September 23, 1873.

Thos. W. Capen.
E. N. Eliot
} WITNESSES

INVENTOR.
Chas. Eaton

AM. PHOTO-LITHOGRAPHIC Co. N.Y. (OSBORNE'S PROCESS.)

UNITED STATES PATENT OFFICE.

CHARLES EATON, OF NEW YORK, N. Y.

IMPROVEMENT IN CURTAIN-FIXTURES.

Specification forming part of Letters Patent No. 132,453, dated October 22, 1872; reissue No. 5,576, dated September 23, 1873; application filed July 24, 1873.

*To all whom it may concern:*

Be it known that I, CHAS. EATON, of the city, county, and State of New York, have invented an Improvement in Spring-Rollers for Curtains and Shades, and like purposes, of which the following is a specification:

This invention relates to those spring-rollers in which the springs are checked and the shade adjusted to the required altitude by a quick motion, or by centrifugal force acting upon movable stops in connection with fixed stops; and my invention consists in the application of a spring-stop or its equivalent in such a manner that, when the movable stop rotating with the roller is brought by centrifugal force into contact with one or more fixed stops, the concussion ordinarily produced by the collision of two or more metallic or hard bodies will be greatly diminished, and thus noise and injury to the fixtures will be prevented.

The accompanying drawings show one mode in which a spring-stop may be applied to a spring-roller to diminish concussion.

Figure 1:
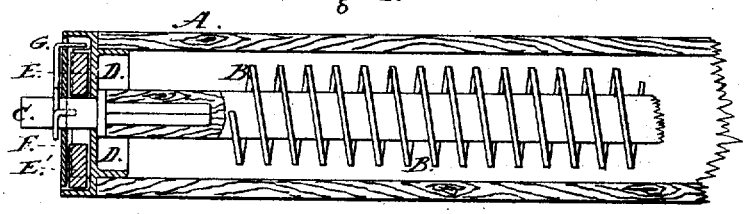
Figure 2:
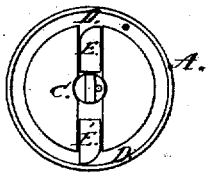
Figure 3:
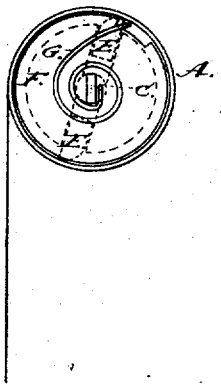

Figure 1 is a sectional view of the end of a spring-roller with the spring attached. Fig. 2 is an end view of the roller with the spring-stop and outer disk removed. Fig. 3 is an end view of the roller complete.

A represents the roller, or a portion of it, with the spiral spring B for rolling up the shade or curtain shown therein and around the fixed axis C, the outer end of which is flattened, to prevent its turning in the bracket fastened upon the window-frame. Upon the end of the roller, and held within it by flanges, is a disk, D, of metal, in the outer face of which is a groove or grooves, in which a movable stop or stops are fitted to move freely to and from the center of the fixed axis. Said stops (shown at E E′) are held in said grooves by an outer disk, as at F, which is fixed upon the axis C, thereby forming a chamber for said stops to work in. Around or attached to the fixed axis C is a spring, G, one end of which is attached to the axis or fixed disk F, and the other end extends out to the circumference of the disk F, and then turns across the space traveled over by the movable stops, so that, when in rotation one of them is brought by centrifugal force into contact with the spring-stop, the latter will be carried around a short distance, thus diminishing the concussion, and preventing noise and injury to the fixtures.

I claim—

In a spring curtain-roller, a spring acting in conjunction with a stop or stops operated by centrifugal force, said spring serving to relieve concussion, substantially as and for the purpose specified.

Witnesses: CHAS. EATON.

DANIEL B. DUDLEY,

ABEL T. HOWARD.